United States Patent
Panguluri et al.

(10) Patent No.: US 10,112,558 B2
(45) Date of Patent: Oct. 30, 2018

(54) SYSTEM, METHOD AND APPARATUS FOR ONE-PAIR POWER OVER ETHERNET IN AN AUTOMOTIVE APPLICATION

(71) Applicant: AVAGO TECHNOLOGIES GENERAL IP (SINGAPORE) PTE. LTD., Singapore (SG)

(72) Inventors: Sesha Thalpasai Panguluri, Cupertino, CA (US); Minh Tran, San Jose, CA (US); James Yu, Pleasanton, CA (US); Wael William Diab, San Francisco, CA (US)

(73) Assignee: AVAGO TECHNOLOGIES GENERAL IP (SINGAPORE) PTE. LTD. (SG)

( * ) Notice: Subject to any disclaimer, the term of this patent is extended or adjusted under 35 U.S.C. 154(b) by 639 days.

(21) Appl. No.: 14/479,938

(22) Filed: Sep. 8, 2014

(65) Prior Publication Data

US 2015/0076901 A1     Mar. 19, 2015

Related U.S. Application Data

(60) Provisional application No. 61/876,294, filed on Sep. 11, 2013.

(51) Int. Cl.
*B60R 16/03*     (2006.01)

(52) U.S. Cl.
CPC ................................ *B60R 16/03* (2013.01)

(58) Field of Classification Search
CPC .................................. H04B 3/60; B60R 16/03
See application file for complete search history.

(56) References Cited

U.S. PATENT DOCUMENTS

| | | | |
|---|---|---|---|
| 3,311,187 A * | 3/1967 | Haggard, Jr. | B60R 25/007 180/272 |
| 3,911,296 A * | 10/1975 | Davis | H03K 17/16 257/E27.01 |
| 6,417,668 B1 * | 7/2002 | Howard | H02J 7/1461 324/426 |
| 2009/0216493 A1 * | 8/2009 | Underdal | G06Q 10/06 702/183 |
| 2010/0177543 A1 * | 7/2010 | DeDona | B60R 11/00 363/145 |
| 2014/0139014 A1 * | 5/2014 | Sontag | H04L 12/40045 307/1 |

\* cited by examiner

*Primary Examiner* — Rexford Barnie
*Assistant Examiner* — Terrence Willoughby
(74) *Attorney, Agent, or Firm* — Foley & Lardner LLP

(57) ABSTRACT

System, method and apparatus for one-pair power over Ethernet in an automotive application. In one embodiment, a power sourcing equipment transmits a forward path current to a powered device via a single conductor pair and receives a return path current from the powered device via a chassis of an automotive vehicle.

17 Claims, 5 Drawing Sheets

SYSTEM, METHOD AND APPARATUS FOR ONE-PAIR POWER OVER ETHERNET IN AN AUTOMOTIVE APPLICATION

This application claims the benefit of and priority to provisional application No. 61/876,294, filed Sep. 11, 2013, which is incorporated herein by reference in its entirety.

BACKGROUND

Field

The present disclosure relates generally to network powering systems, methods and apparatus and, more particularly, to a system, method and apparatus for one-pair power over Ethernet in an automotive application.

Introduction

Power over Ethernet (PoE) provides a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

Conventionally, the power over Ethernet specifications are designed to work on two-pair cabling using a pair of transformers. Power over Ethernet is capable of running over a worst case distance of 100 meters on two wire pairs of Category 3 Ethernet cabling and higher power devices are capable of running on a worst case distance of 100 meters on two pairs of Category 5 Ethernet cabling.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

An approach for powering in a one-pair conductor Ethernet transmission system is provided. In one application, the one-pair conductor Ethernet transmission system can be applied to an automotive vehicle environment. In one embodiment, a one-pair powering approach includes transmitting, by a power sourcing equipment, a forward path current to a powered device via a single conductor pair, a first portion of the forward path current carried over a first conductor of the single conductor pair, a second portion of the forward path current carried over a second conductor of the single conductor pair, and a return path current from the powered device to the power sourcing equipment carried by a chassis of an automotive vehicle.

In one embodiment, the power sourcing equipment is coupled to a positive terminal of a battery (e.g., 12V) of the automotive vehicle, wherein the battery is connected to the chassis of the automotive vehicle. In one embodiment, the power sourcing equipment is connected to the single conductor pair via a transformer. In another embodiment, the power sourcing equipment is connected to the single conductor pair via an inductor. In one embodiment, the single conductor pair is a single twisted wire pair.

PoE can be used to deliver power over one or more wire pairs that are used for data transmission. PoE can be applied to various contexts and can be used alongside various data transmission systems. Ethernet has an extensive, well-developed ecosystem that has spanned various media specifications, including backplane, twinax, twisted-pair, coaxial, optical fiber, etc. In that regard, Ethernet has a vast amount and variety of proven physical layer device (PHY) products, media access control (MAC) products, switch products, etc.

Figure 1:
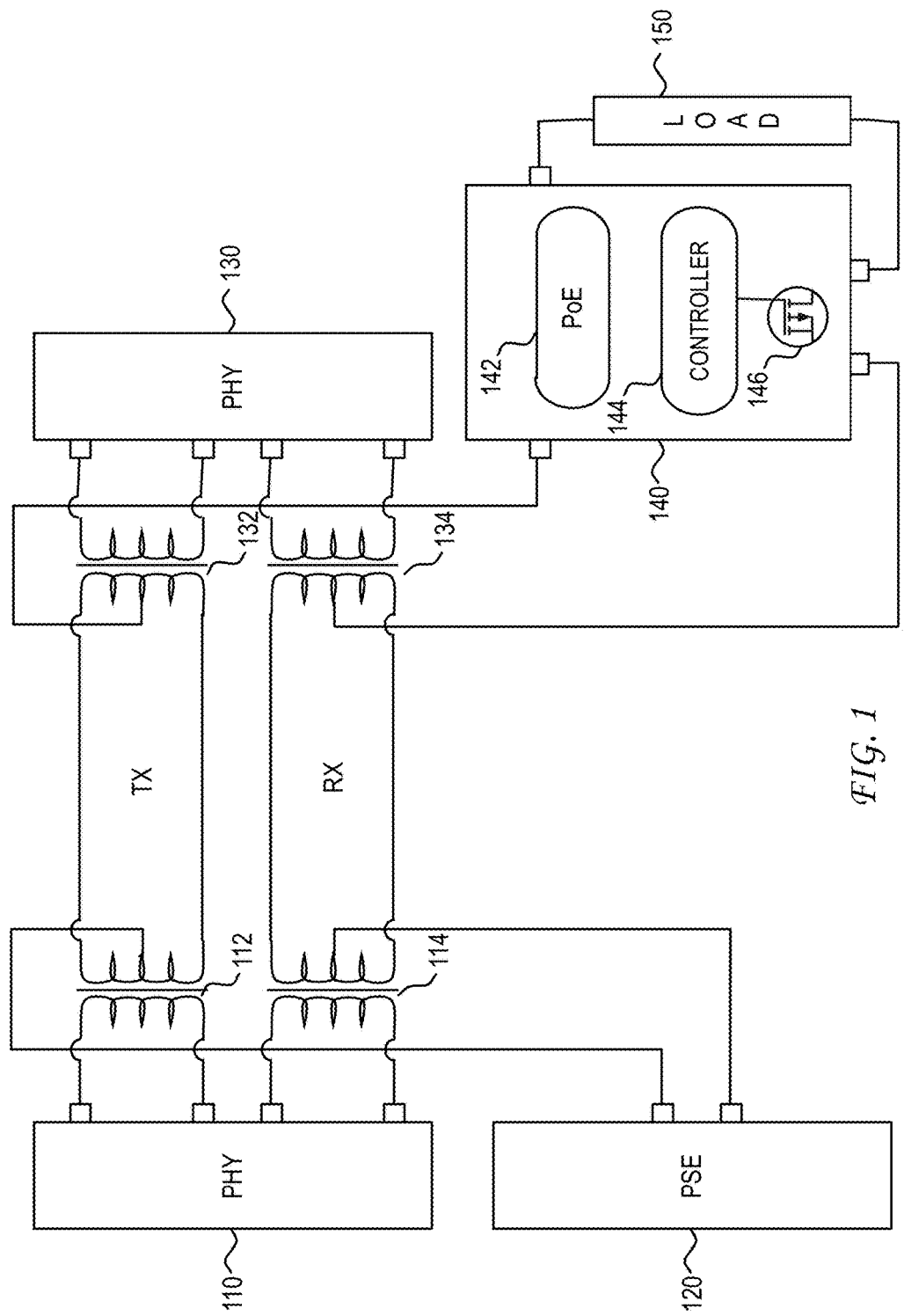
FIG. 1 illustrates an embodiment of a two-pair power over Ethernet system.

FIG. 1 illustrates an example of a two-pair PoE system. As illustrated, the two-pair PoE system includes PSE 120 that transmits power to PD 140 over two conductor pairs such as two twisted wire pairs. In the example illustration, the two twisted wire pairs are referenced as transmit (TX) and receive (RX) wire pairs.

Power delivered by PSE 120 to PD 140 is provided through the application of a voltage across the center taps of a first data transformer 112 that is coupled to the TX wire pair and a second data transformer 114 that is coupled to the RX wire pair carried within a twisted pair Ethernet cable. PD 140 receives the power transmitted by PSE 120 at the center taps of a third data transformer 132 that is coupled to the TX wire pair and a fourth data transformer 134 that is coupled to the RX wire pair.

As is further illustrated in FIG. 1, PD 140 includes PoE module 142. PoE module 142 includes the electronics that would enable PD 140 to communicate with PSE 120 in accordance with a PoE specification such as IEEE 802.3af, 802.3at, legacy PoE transmission, or any other type of PoE transmission. PD 140 also includes controller 144 (e.g., pulse width modulation DC:DC controller) that controls power transistor 146 (e.g., FET or bipolar), which in turn provides constant power to load 150.

In the illustration of FIG. 1, power is delivered by PSE 120 to PD 140 via two conductor pairs through connection of PSE 120 to the center taps of data transformers 112 and 114 and connection of PD 140 to the center taps of data transformers 132 and 134.

Figure 2:
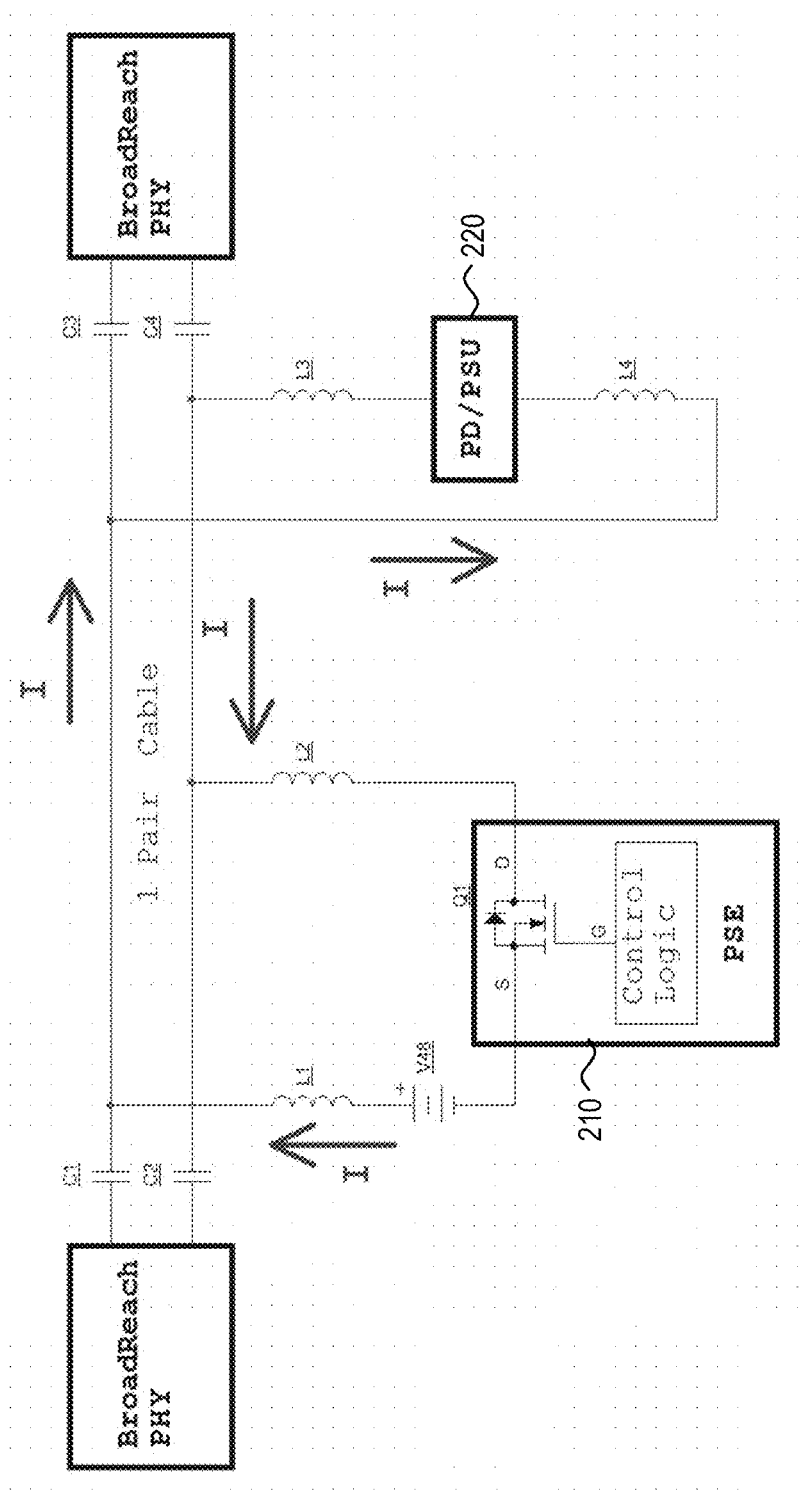
FIG. 2 illustrates an example of a power over Ethernet system that delivers power over one wire pair.

FIG. 2 illustrates an example of an application of PoE to a one-pair Ethernet system. An example of such a one-pair Ethernet system is Broadcom's BroadR-Reach® technology that supports both 100-meter traditional Ethernet services and other applications that require longer than 100-meter reach or operation over a single conductor pair. In various examples, the extended reach broadens the range of cable installations and can be used for new IP services and applications such as broadband access, voice over IP, wireless access points, and surveillance cameras.

As illustrated in FIG. 2, power is injected onto the single conductor pair by PSE 210 after blocking capacitors C1, C2. Similarly, power is extracted from the single conductor pair by PD 220 before blocking capacitors C3, C4. In this framework, the current "I" is carried along a first conductor of the single conductor pair in the forward path from PSE 210 to PD 220 and is carried along a second conductor of the single conductor pair in the return path from PD 220 to PSE 210.

As further illustrated in FIG. 2, capacitors C1, C2 on the PSE side and capacitors C3, C4 on the PD side are designed to block or otherwise prevent DC current injected by PSE 210 from flowing into data transformers of the PHYs. Significantly, capacitors C1, C2 on the PSE side and capacitors C3, C4 on the PD side do not impact the data transmission between the PHYs as AC current passes through capacitors C1, C2, C3, C4.

One example area of application for PoE is automotive networks. As evidenced by the increasing demand for in-vehicle infotainment (e.g., video, navigation, etc,), control systems (e.g., back-up cameras), etc., the networking challenges of automotive networks continue to increase. Complex automotive network management and domain control is needed in supporting various network topologies within an automotive vehicle.

In the present disclosure, it is recognized that the application of PoE to automotive networks can produce significant benefits in further reducing the wiring needed within an automotive vehicle. As would be appreciated, the sheer weight of a wiring harness to support all of the network requirements within the automotive vehicle can be substantial. Consider, for example, the powering of a back-up camera that is located at the rear-end of an automotive vehicle. Through PoE technology, the elimination of separate wiring for powering of the back-up camera can greatly simplify the implementation of such an application within the automotive vehicle. The removal of excess cabling also reduced the overall weight of the wiring harness.

In the present disclosure, it is recognized that the application of PoE to an automotive network environment presents unique implementation challenges. One of the issues is a reduced voltage source. For example, a PSE in an automotive network can be designed to source power from a 12V battery. This is in contrast to 48V power sources used in an enterprise environment. A consequence of using a lower voltage source is the higher current levels that are required to support a particular power level (e.g., 7 W) at the PD. The higher current levels can create higher power losses in the cabling itself, as well as a higher voltage drop across the cable.

For example, consider a 40 meter cable in an automotive network that has a resistance of 10Ω. For a current of 600 mA, the power loss attributable to each conductor would be PL=$I^2$*R=(600 mA)$^2$*10Ω=3.6 W. For the same current of 600 mA, the voltage drop across the cable would be V=I*R=600 mA*10Ω=0.6V. As would be appreciated, The power loss attributable to the cable as well as the magnitude of the voltage drop would only increase as the current levels increase.

Figure 3:
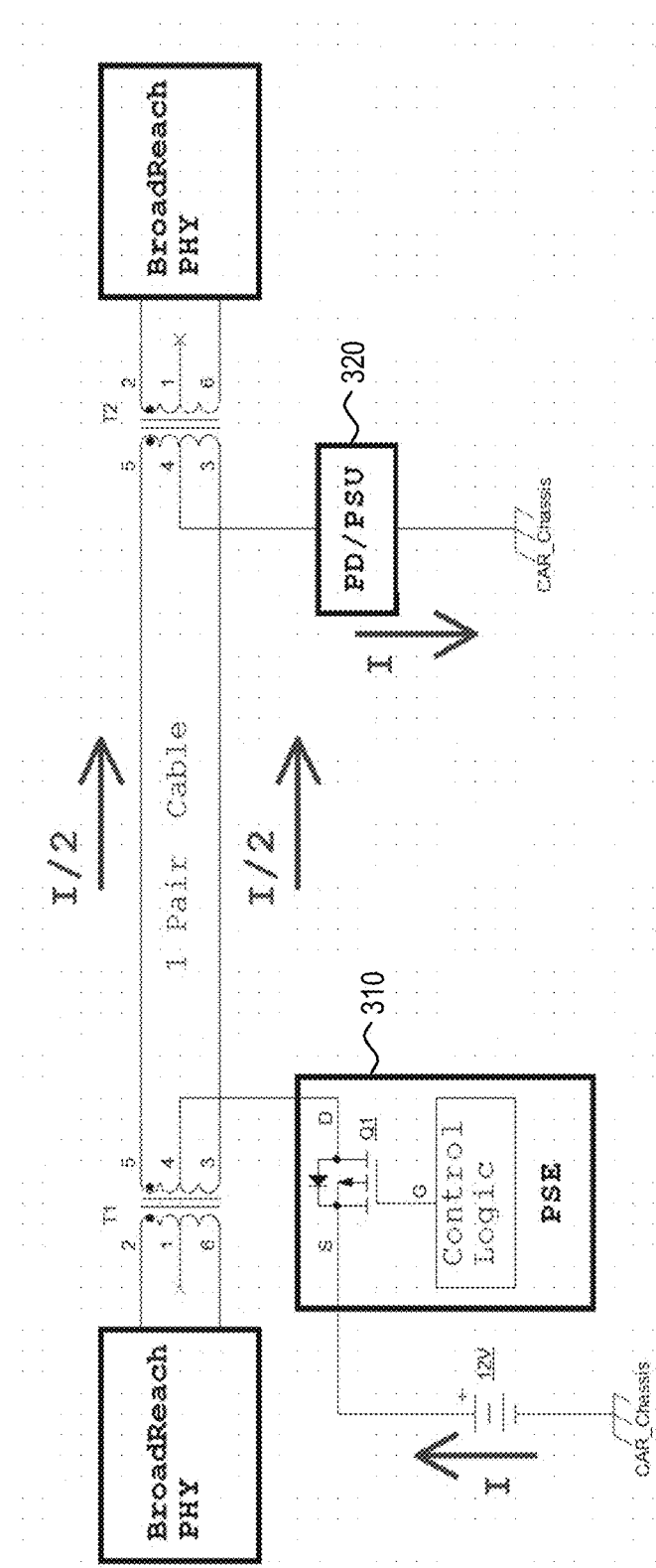
FIG. 3 illustrates an example embodiment of a power over Ethernet system that delivers power over one wire pair in an automotive application.

In the present disclosure, it is recognized that a reduction in the adverse impact of the cable in an application of PoE to a one-pair Ethernet system in an automotive network is desired. FIG. 3 illustrates an example embodiment of a power over Ethernet system that delivers power over one wire pair in an automotive application. As illustrated, both conductors of the single conductor pair are used to carry current in the forward path from PSE 310 to PD 320. As illustrated, the current I is split between the first and second conductors of the single conductor pair. Assuming that the two separate conductors in the single conductor pair are balanced, the current I is split roughly equally such that the current I/2 is carried over each of the two separate conductors.

On the return path from PD 320 to PSE 310, the current I is carried over a chassis of the automotive vehicle that connects the power source (e.g., 12V battery) to PD 320. In the present disclosure, it is recognized that the resistance of the chassis of the automotive vehicle is very small and could be neglected since the space of the chassis of the automotive vehicle is very large.

As illustrated, PSE 310 is connected to the positive terminal of the battery. It is recognized that the control by PSE 310 of the current loop on the high side of the battery would enable PSE 310 to provide proper protection should the cable or load short to the chassis of the automotive vehicle. Here, it should be recognized that other implementation-dependent protection mechanism can be implemented such that the PSE control can be placed on the low side of the battery.

As noted, the resistance of the chassis of the automotive vehicle in the return path from PD 320 to PSE 310 is negligible in comparison to the resistance of the single conductor pair used in the forward path from PSE 310 to PD 320. In the same example of a 40 meter cable having 10Ω of resistance, the power loss attributable to each conductor would be PL=$(I/2)^2$*R=(600 mA/2)$^2$*10Ω=0.9 W. Notably, the power loss attributable to the cable would represent ¼ of the power loss. The voltage drop across the cable would be V=I/2*R, or ½ of the voltage drop in comparison.

Figure 4:
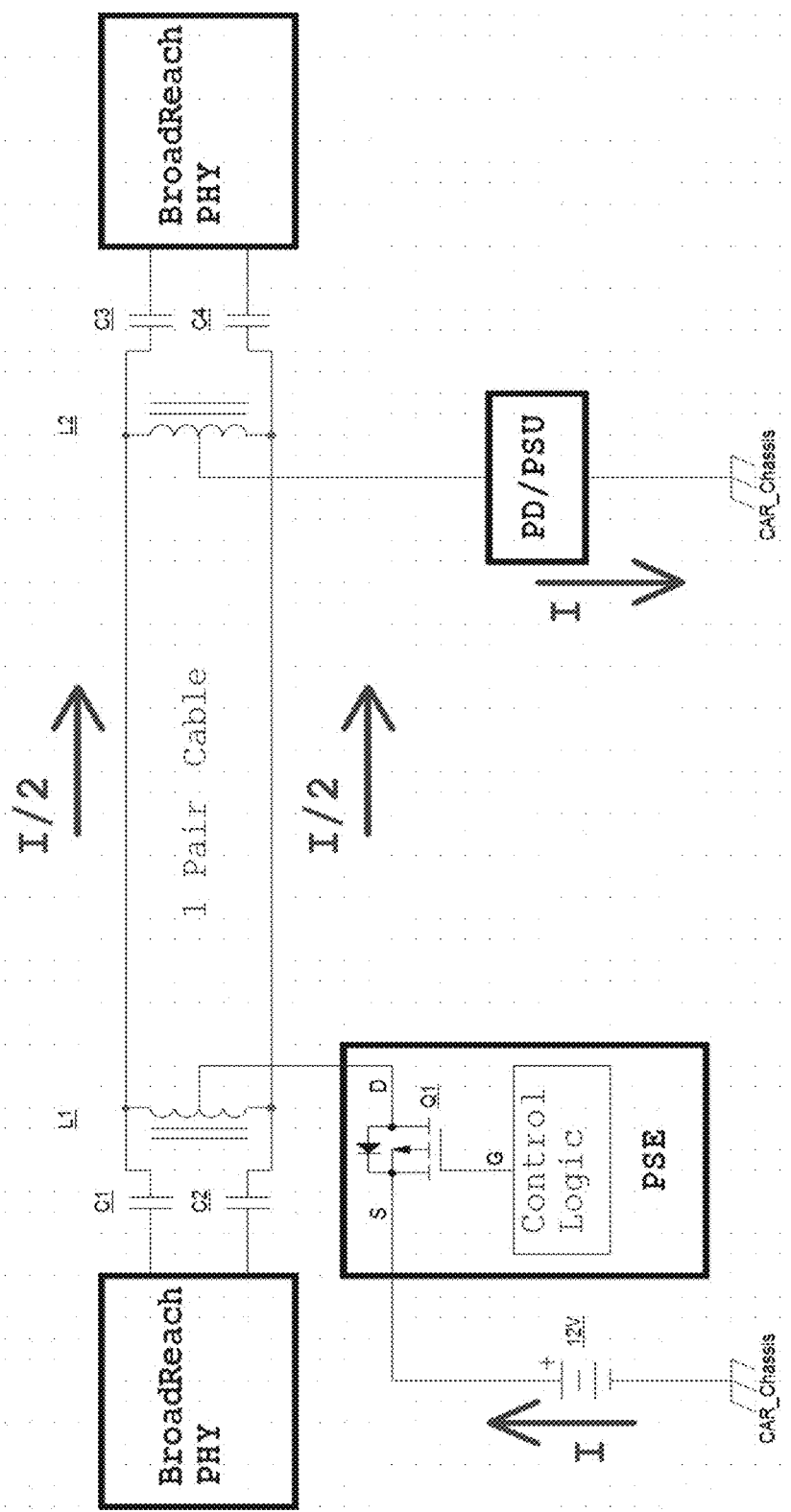
FIG. 4 illustrates another example embodiment of a power over Ethernet system that delivers power over one wire pair in an automotive application.

As further illustrated in FIG. 3, PSE 310 and PD 320 are connected to center taps of transformers T1 and T2, respectively. This enables DC blocking for the PHYs, while enabling a passage of AC signals between the PHYs. In another embodiment illustrated in FIG. 4, the PSE and PD are connected to inductors L1, L2, respectively, while blocking capacitors C1, C2, C3, C4 are used.

Figure 5:
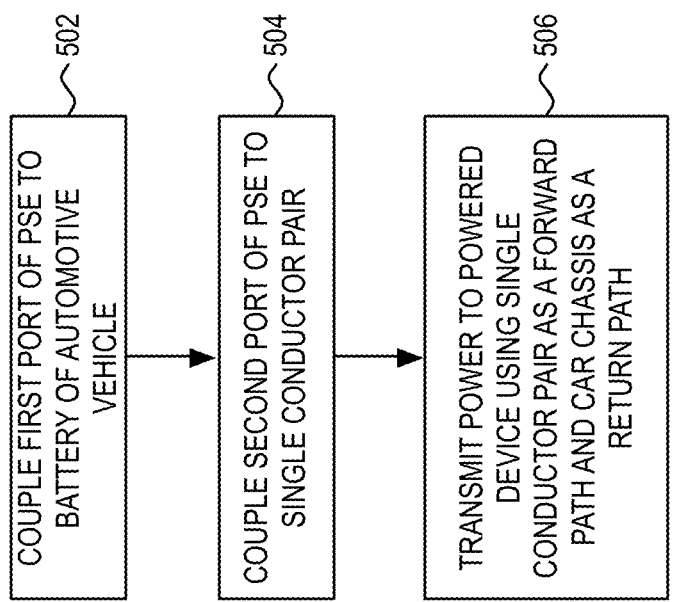
FIG. 5 illustrates a flowchart of an example process.

Having described a framework for implementing one-pair PoE in an automotive application, reference is now made to FIG. 5, which illustrates a flowchart of an example process. As illustrated, the process begins at step 502 where a first port of a PSE is coupled to a forward path to the PD using a single conductor pair. As noted, the particular mechanism for coupling of the first port of the PSE to the single conductor pair can vary. In one example, the PSE can be coupled to the high side of the battery of an automotive vehicle such that the PSE is directly coupled to the single conductor pair (e.g., using a transformer, inductor, or other coupling mechanism). In another example, the PSE can be coupled to the low side of the battery of an automotive vehicle, wherein the high side of the battery is directly coupled to the single conductor pair (e.g., using a transformer, inductor, or other coupling mechanism). In general, the particular mechanism of coupling of the PSE to the forward path can vary.

Next, at step 504, a second port of the PSE is coupled to a return path from the PD using a chassis of the automotive vehicle. Again, the particular mechanism for coupling of the second port of the PSE to the chassis of the automotive vehicle can vary. In one example, the PSE can be coupled to the low side of the battery of an automotive vehicle such that the PSE is directly coupled to the chassis of the automotive vehicle. In another example, the PSE can be coupled to the high side of the battery of an automotive vehicle, wherein the low side of the battery is directly coupled to the chassis of the automotive vehicle. In general, the particular mechanism of coupling of the PSE to the return path can vary.

After the coupling of the PSE at steps 502 and 504 to the forward and return paths, respectively, the PSE can then transmit power to the PD at step 506 using the established forward and return paths. In this power-delivery process, a first portion of the forward path current is carried over a first conductor of the single conductor pair, a second portion of the forward path current is carried over a second conductor of the single conductor pair, and a return path current from the PD to the PSE is carried by a chassis of the automotive vehicle.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A method, comprising:
    transmitting, by a power sourcing equipment, a forward path current to a powered device via a single conductor pair, a first portion of the forward path current carried over a first conductor of the single conductor pair and a second portion of the forward path current carried over a second conductor of the single conductor pair, and a return path current from the powered device to the power sourcing equipment carried by a chassis of an automotive vehicle,
    wherein the power sourcing equipment is coupled to a battery of the automotive vehicle, the battery connected to the chassis of the automotive vehicle, and the chassis connected to the powered device, and
    wherein a difference between a resistance of the chassis and a resistance of the single conductor pair provides a predetermined power loss attributable to a predetermined length of the single conductor pair.

2. The method of claim 1, wherein the battery is a 12V battery.

3. The method of claim 1, wherein the power sourcing equipment is connected to a positive terminal of the battery.

4. The method of claim 1, wherein the power sourcing equipment is connected to the single conductor pair via a transformer.

5. The method of claim 1, wherein the power sourcing equipment is connected to the single conductor pair via an inductor.

6. The method of claim 1, wherein the single conductor pair is a single twisted wire pair.

7. A power sourcing equipment, comprising:
    a first port that is configured for coupling to a battery of an automotive vehicle, wherein the battery is connected to a chassis of the automotive vehicle, and the chassis is connected to a powered device;
    a second port that is configured for coupling to a single conductor pair; and
    control logic that is configured to control a delivery of power to the powered device via the single conductor pair, a first portion of a forward path current carried over a first conductor of the single conductor pair, a second portion of the forward path current carried over a second conductor of the single conductor pair, and a return path current from the powered device to the power sourcing equipment carried by the chassis of the automotive vehicle,
    wherein a difference between a resistance of the chassis and a resistance of the single conductor pair provides a predetermined power loss attributable to a predetermined length of the single conductor pair.

8. The power sourcing equipment of claim 7, wherein the battery is a 12V battery.

9. The power sourcing equipment of claim 7, wherein the first port of the power sourcing equipment is coupled to a positive terminal of the battery.

10. The power sourcing equipment of claim 7, wherein the second port is coupled to the single conductor pair via a transformer.

11. The power sourcing equipment of claim 7, wherein the second port is coupled to the single conductor pair via an inductor.

12. The power sourcing equipment of claim 7, wherein the single conductor pair is a single twisted wire pair.

13. A method, comprising:
    coupling a first port of a power sourcing equipment to a battery of an automotive vehicle, wherein the battery is connected to a chassis of the automotive vehicle, and the chassis is connected to a powered device;
    coupling a second port of the power sourcing equipment to a single conductor pair; and
    controlling a delivery of power from the power sourcing equipment to the powered device via the single conductor pair, a first portion of a forward path current carried over a first conductor of the single conductor pair, a second portion of the forward path current carried over a second conductor of the single conductor pair, and a return path current from the powered device to the power sourcing equipment carried by the chassis of the automotive vehicle,
    wherein a difference between a resistance of the chassis and a resistance of the single conductor pair provides a predetermined power loss attributable to a predetermined length of the single conductor pair.

14. The method of claim 13, wherein the first port is coupled to a positive terminal of the battery.

15. The method of claim 13, wherein the second port is coupled to the single conductor pair via a transformer.

16. The method of claim 13, wherein the second port is coupled to the single conductor pair via an inductor.

17. The method of claim 13, wherein the single conductor pair is a single twisted wire pair.

\* \* \* \* \*